US009104726B2

(12) United States Patent
Simon

(10) Patent No.: US 9,104,726 B2
(45) Date of Patent: Aug. 11, 2015

(54) COLUMNAR DATABASES

(71) Applicant: Smartfocus Holdings Limited, London (GB)

(72) Inventor: Jean-Yves Simon, London (GB)

(73) Assignee: Smartfocus Holdings Limited (GB)

( * ) Notice: Subject to any disclaimer, the term of this patent is extended or adjusted under 35 U.S.C. 154(b) by 17 days.

(21) Appl. No.: 13/759,625

(22) Filed: Feb. 5, 2013

(65) Prior Publication Data
US 2014/0222777 A1 Aug. 7, 2014

(51) Int. Cl.
G06F 17/30 (2006.01)
(52) U.S. Cl.
CPC .... *G06F 17/30442* (2013.01); *G06F 17/30315* (2013.01)
(58) Field of Classification Search
CPC .................................................. G06F 17/30315
USPC ........................................................ 707/756
See application file for complete search history.

(56) References Cited

U.S. PATENT DOCUMENTS

2009/0174583 A1* 7/2009 Diaz-Gutierrez et al. ...... 341/65

OTHER PUBLICATIONS

Abadi et al., Materialization Strategies in a Column-Oriented DBMS, Proceedings of ICDE 2007.*

* cited by examiner

*Primary Examiner* — William Spieler
(74) *Attorney, Agent, or Firm* — Rajesh Vallabh; Foley Hoag LLP

(57) ABSTRACT

A method of searching for sets of data in a very large columnar database is described. The method comprises carrying out a first query by querying the very large columnar database for a first desired set of data, the database having a range of possible data storage locations; creating a compressed columnar representation of the locations within the very large columnar database of members of the first desired set of data; wherein the compressed columnar representation comprises a plurality of representations covering the entire range of the very large database, wherein each representation provides a descriptor describing a distribution of the desired data results within the sub-range of the entire range; storing the compressed columnar representation in a data cache; and applying a logical operation on first desired set of data stored within the very large columnar database by using the compressed columnar representation stored in the data cache in preference to data stored within the very large columnar database.

27 Claims, 9 Drawing Sheets

COLUMNAR DATABASES

FIELD OF THE INVENTION

The present invention concerns improvements relating to use of column databases. More particularly, though not exclusively, the present invention relates to an improved column database compression method taking advantage of a data structure which allows searches to be performed on large databases at optimum speed.

BACKGROUND TO THE INVENTION

The proliferation of computer technology has led to it becoming an essential tool in situations where people wish to store and extract information from large pools of data. Marketing and customer intelligence are only two examples of fields which are relying more and more on computer technology for storing data and extracting useful information from it. For example, it is now common practice for marketers to work with very large databases containing details of their existing and prospective customers. In order to tailor their advertising, they need to be able to select for customers fitting into a particular profile. For instance, an exemplary query could be 'find all clients under 20, who are married and are earning over £40,000 per year'. The database must therefore be able to efficiently perform this type of query.

As marketers frequently need to perform this type of query, performance expectations for speed and efficiency are high, while datasets are becoming increasingly large, making searches slower and more computationally expensive. Traditional databases scan their external, large datastores for the required results and subsequently perform any further processing required there, before they return the final result to the client. However, a database may contain vast amounts of data, making the search time consuming, while large datastores generally have slow access retrieval times.

Accordingly data storing and searching techniques and systems are not sufficiently fast to address the mismatch between increased workload for data storage systems and the need for speed and efficiency in querying databases and retrieving data selections.

Several approaches have been employed to seek to address this problem, with limited success.

One popular approach has been the incorporation of very fast hardware for integrated chip memory to mitigate the use of a hard disc access for each database access as this is one of the most time consuming parts of a search and retrieval process. However, one major disadvantage of this approach is that it comes with a very high cost. Also there are physical limitations to the improvements that can be made in access times using this approach, ultimately limiting the increase in speed that can be achieved.

An alternative approach is to pre-calculate all possible queries and query combinations, so as to eliminate the time required to retrieve the results when a client is performing a search. This technique however does not actually solve the problem of slow data retrieval, but merely conceals it from the user, by transferring it to the provider. There are also further disadvantages in that database updating becomes a more complicated task as all the searches need to be recalculated.

Another approach is the use of columnar databases. As column data is of uniform type, adjacent records are similar, therefore more compressible. The compression permits columnar operations such as MIN, MAX, SUM, COUNT and AVG to be performed very rapidly. Another benefit of columnar databases over row-oriented databases is that they are self-indexing thereby occupying less disc space than a relational database management system containing the same data. Columnar compression can reduce the disk space required further. However, due to the compression, data retrieval is very inefficient, while decompression is also very time consuming, adding an extra step in the process.

The present invention seeks to address at least some of the problems and provide an improved data retrieval method.

SUMMARY OF THE INVENTION

According to one aspect of the present invention there is provided a computer-implemented method of searching for sets of data in a very large columnar database, the method comprising: carrying out a first query by querying the very large columnar database for a first desired set of data, the database having a range of possible data storage locations; creating a compressed columnar representation of the locations within the very large columnar database of members of the first desired set of data; wherein the compressed columnar representation comprises a plurality of representations covering the entire range of the very large database, wherein each representation provides a descriptor describing a distribution of the desired data results within the sub-range of the entire range; storing the compressed columnar representation in a data cache; and applying a logical operation on first desired set of data stored within the very large columnar database by using the compressed columnar representation stored in the data cache in preference to data stored within the very large columnar database.

The present invention constitutes an improved computer-implemented method of compressing column data, to be used preferably, but not exclusively, for searches on very large datasets. An embodiment of the present invention comprises of a computer-implemented method to combine data structures and to compress them and the representations they consist of by finding, and converting them to, their most compact representations. This, when used in a data mining context, makes the searching process a lot faster, because it allows a greater number of the results to be compressed enough to fit in a fast access data store, which accelerates the process for reading the results as a larger number of results don't have to be retrieved from a hard disk.

This is especially significant when complicated selections are required, which involve using the results of more than one queries and using logical operations on them. In this case, the comparative advantage of using an embodiment of the present invention is even larger, as the various result sets can be saved to a fast access memory, allowing the logical operations to be performed there, significantly reducing the time of the overall procedure.

The computer-implemented method may further comprise obtaining the results of the applying step as a columnar representation and optimising the results. The optimising step may comprise optimising each of the representations of the resultant columnar representation to determine the descriptor to be applied to each representation in view of the current distribution of data results within the sub-range of the entire range. Also the optimising step may advantageously comprise establishing whether the number of results provided in the compressed columnar representation is a single block representation or a multi-block representation and determining whether the representation needs to be converted into a multi-block or single block representation respectively.

The determining step may comprise determining whether the number of positive results for a single block compressed columnar representation is above a predetermined threshold and if so converting the single block compressed columnar representation into a multi-block representation. Alternatively, the determining step may comprise determining whether the number of positive results for a multi-block compressed columnar representation is below a predetermined threshold and if so converting the multi-block compressed columnar representation into a single block representation.

The computer-implemented method may further comprise storing the results of the logical operation in the data cache as a compressed columnar representation.

The computer-implemented method advantageously further comprises obtaining a second desired set of data, the second set being provided in a compressed columnar representation. In this case, the computer-implemented method may further comprise adapting one of the first and second sets of results into a form which is compatible with the other of the first and second set of results respectively for a logical operation to be performed with each set of results being an operand of the logical operation. Preferably the adapting step comprises changing the size, number and type of representations within one of the compressed columnar representations to match the size and number of representations within the other columnar representation.

The compressed columnar representation may comprise an inversion flag for inverting the results stored therein. The advantage of this feature is that it permits opposite types of sets to be stored with minimum use of space as a single set and a flag.

There are various different types of compressed columnar representation which can be used by the present invention which are described below. Accordingly the compressed columnar representation may comprise an 'Empty' type having no positive results within the sub-range the representation covers. Another compressed columnar representation comprises a 'Full' type having only positive results within the sub-range the representation covers. Another compressed columnar representation comprises a 'Single' type having one positive result within the sub-range the representation covers. Another compressed columnar representation comprises an 'Inverted Single' type having all but one positive result within the sub-range the representation covers. Another compressed columnar representation comprises a 'Range' type having a sequence of positive results between two specified points within the sub-range the representation covers. Another compressed columnar representation comprises an 'Inverted Range' type having a sequence of negative results between two specified points within the sub-range the representation covers. Another compressed columnar representation comprises a 'List' type having a list of positive results provided within the sub-range the representation covers, wherein the number of positive results is below a predetermined threshold. Another compressed columnar representation comprises an 'Inverted List' type having a list of negative results provided within the sub-range the representation covers, wherein the number of negative results is below a predetermined threshold. A further compressed columnar representation comprises a 'Bit Array' type having positive result within the sub-range the representation covers, wherein the number of positive results is between a predetermined threshold and size of the sub-range the representation covers minus the threshold.

Preferably a step of reading and the step of storing the compressed columnar representations comprises using CSG-File classes.

Preferably the computer-implemented method further comprises waiting a predetermined amount of time after a compressed columnar representation has been stored to the data cache before reading out the compressed columnar representation is permitted.

Preferably each of the compressed columnar representations comprises a RidSet.

According to another aspect of the present invention there is provided a database manager arranged to search for sets of data in a very large columnar database, the database manager comprising: a datastore query engine for carrying out a first query by querying the very large columnar database for a first desired set of data, the database having a range of possible data storage locations; an integrated database manager for creating a compressed columnar representation of the locations within the very large columnar database of members of the first desired set of data; wherein the compressed columnar representation comprises a plurality of representations covering the entire range of the very large database, wherein each representation provides a descriptor describing a distribution of the desired data results within the sub-range of the entire range; a storage module for storing the compressed columnar representation in a data cache; and a combination module for applying a logical operation on first desired set of data stored within the very large columnar database by using the compressed columnar representation stored in the data cache in preference to data stored within the very large columnar database.

According to another aspect of the present invention there is provided a computer-implemented method of searching for sets of data in a very large columnar database, the method comprising: carrying out a first query by querying the very large columnar database for a first desired set of data; creating a Ridset of the locations within the very large columnar database of members of the desired set of data; storing the Ridset in a data cache; carrying out a second query for a second set of desired data stored within the very large columnar database, the second query including using the Ridset stored in the data cache in preference to querying the very large columnar database when the further search includes the first desired set of data as at least a subset of the second desired data The present invention may also be expressed as a computer-implemented method of searching for a desired data set in a very large columnar database, the method comprising carrying out a first query by querying the very large columnar database for a first set of data; creating a first Ridset of the locations within the very large columnar database of members of the first set of data; carrying out a second query by querying the very large columnar database for a second set of data; creating a second Ridset of the locations within the very large columnar database of members of the second set of data; storing the first and second Ridsets in an integrated data cache; carrying out a logical operation on the first and second Ridsets to determine the desired data set stored within the very large columnar database.

BRIEF DESCRIPTION OF THE DRAWINGS

In order for the invention to be better understood, reference will be made, by way of example, to the accompanying drawings in which:

FIG. 4 is schematic diagram of the Database Manager of FIG. 1, showing a plurality of processing modules and the functional sub-modules they are made up of;

DETAILED DESCRIPTION OF THE EXEMPLARY EMBODIMENTS

Figure 1:
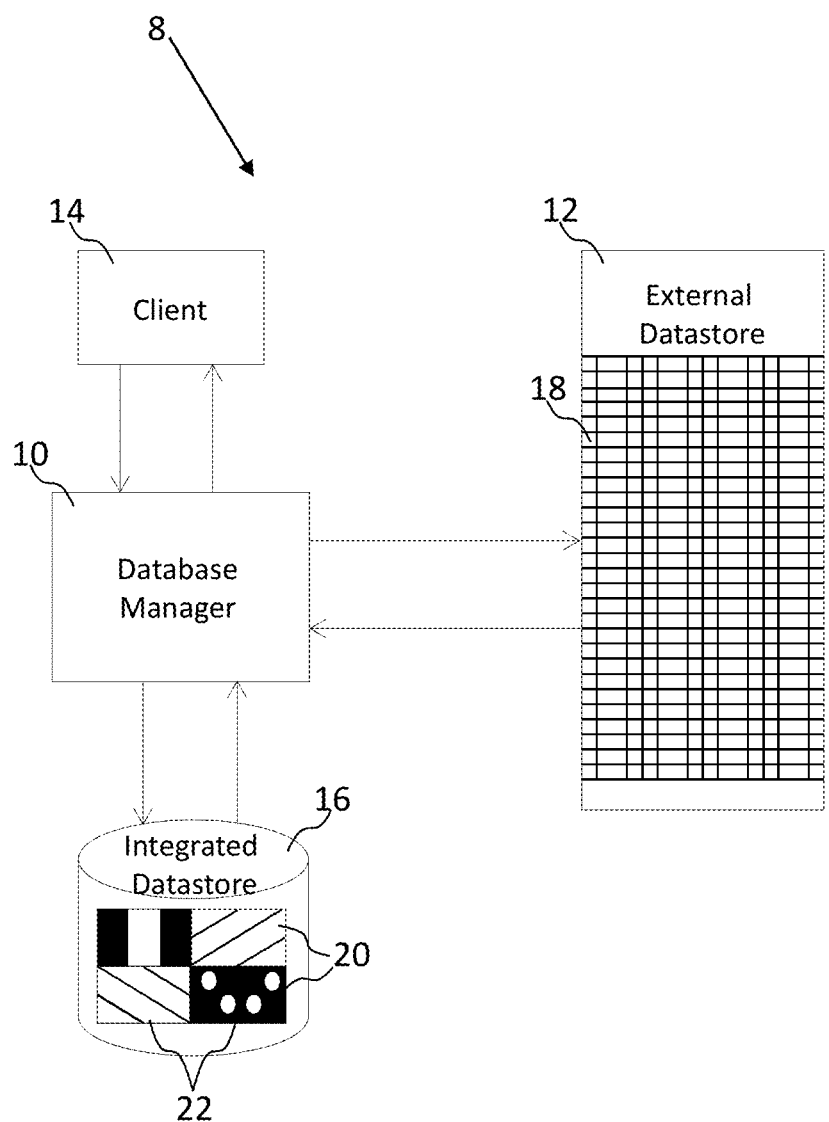
FIG. 1 is a schematic diagram of a data management system according to an embodiment of the present invention.

The overall architecture of a data management system 8 embodying the present invention is now described referring to FIG. 1. The data management system 8 comprises a database manager 10 which can communicate with an external datastore 12 (e.g. a hard drive), a client 14 and an integrated data store 16 (e.g. RAM, cache etc).

The client 14 is a piece of computer software or hardware that accesses the service made available by the data management system.

The database manager 10 controls the creation, maintenance and use of a database, allowing various programs to access it, create, add, and retrieve selections.

The integrated datastore 16, such as a cache or RAM, is a block of memory, typically much smaller than the external datastore 12, which is used to store temporarily data selections. Because of their small size and the different technology they employ, integrated datastores provide a much quicker means of accessing and retrieving data than an external datastores.

Stored in the external datastore 12 is a very large database comprising a multitude of rows of data, in a column database structure 18. The term 'very large database' refers to a database having the equivalent of at least 100,000 row entries and typically one which has the equivalent of at least 1,000,000 row entries. Stored in the integrated datastore 16, are RidSet data structures 20. The Ridsets 20 are made up of different types of structures called 'representations' 22, as will be explained with more detail below, with reference to FIG. 2. The client 14, can query the stored data via the database manager 10.

When a column database 18 is queried, a column is scanned on the external datastore and a 1 or 0 (representing 'true' or 'false') is held in a corresponding data structure in the integrated datastore 16 to indicate if the row is a hit or miss. This is a result set and it is stored as a Ridset data structure 20.

Figure 2:
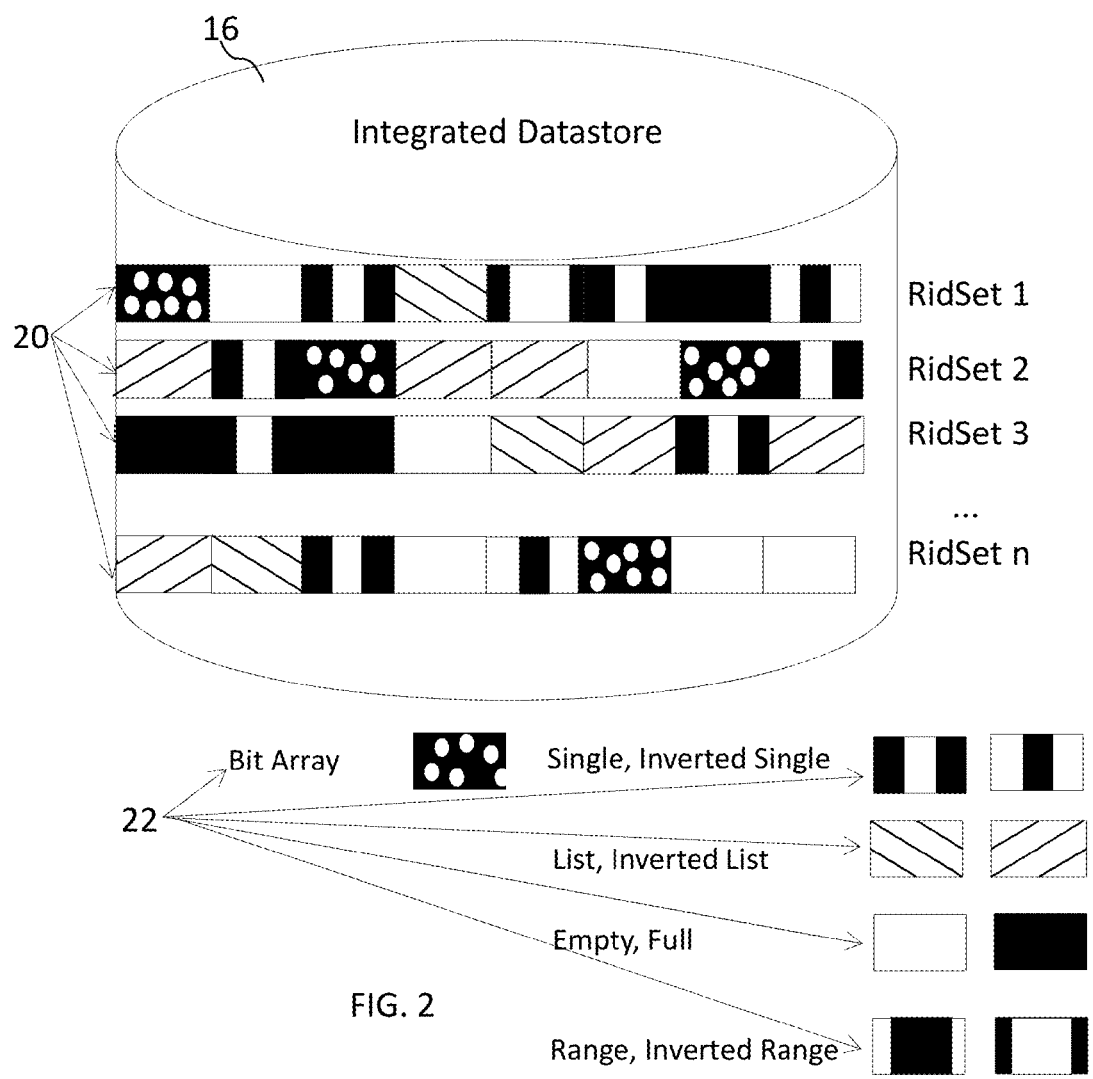
FIG. 2 is a schematic block diagram of the Integrated Datastore of FIG. 1 showing a plurality of Ridsets made up of different blocks.

A Ridset, 20, provides a way of representing a selection of data from a columnar data structure in an efficient way. A Ridset 20 is typically broken down, as shown in FIG. 2, into a plurality of representations 22 of sub-ranges of records, each representation being assigned a type which represents a summary of the results within a sub-range of records. In this way, the type of representation can be considered to be a depiction of a data distribution within a specific range made up of sub-ranges. The sub-ranges can be blocks of data. Each block is typically four pages of memory (as a page is 4096 bytes, each block comprises a total of 131,072 bits). In this case each representation's type is dependent on the distribution of bits within the block (sub-range) it represents, in order to optimise the storage space and performance. In some cases, the representation may have a type which effectively represents the block as a bitmap as there are numerous results within the sub-range of the block. However, there are other types of representation (described below) which are more suited to enable data compression. Each representation also has a data pointer (not shown) provided to help in reading of this representation and some representation code (not shown) which can be used to manage the data pointer.

There are five core representation types, as shown in FIG. 2, and their inverted types. If an Inverted flag (not shown) is set on a representation, then each bit that is set in the memory actually means that the record is not included in the Ridset 20. This inversion mechanism provides a very fast method for inverting Ridsets. The representation type 'Empty' is the most efficient way of representing an empty selection (no bits have been selected) or a full selection (all bits have been selected). In the latter case, if all bits have been selected, they are represented by an 'Inverted Empty', i.e. a 'Full' representation. An 'Empty' type representation has no corresponding data so the data pointer is NULL.

A selection which involves only one bit set to true, or all but one bits set to true, within the range of the block (sub-range) it represents, is most efficiently represented by a 'Single' or an 'Inverted Single' representation respectively. A representation that is marked as 'Single' has its data pointer (not shown) pointing to a <SWORD> value, and the representation code (not shown) is responsible for allocating and deleting the corresponding <SWORD>.

A selection of data which includes all the records between two points, including the two points—effectively a continuous series of records—is best represented by a 'Range'. If the representation is inverted those bits between the two points, including the two points are false, and the bits on either end are true instead.

A representation that has a list of record IDs (identifiers) that represent the bits that are true (or the bits that are false if the block is inverted) is a 'List' or 'Inverted List' type. This is the optimal representation for a sparse selection, and the data pointer references a list <SWORD> object (not shown) that stores the list of record IDs.

A representation that is marked as 'Bit Array' has a block of memory that it uses to store the individual bits. There is one bit of memory per record, so the memory required is four pages. A 'pMemBlock' pointer references the block of memory that the 'Bit Array' is stored in. The memory allocated is actually five pages, which enables an offset of up to one page to be provided that ensures a page-aligned section that is at least four pages long. Using page-aligned memory is beneficial to the saving and loading codes, because it can then use the fast scatter-gather file operations. Once the memory is allocated, the 'data' pointer is set to the start of the first full page of memory.

The main difference between all these representation types, as far as memory usage optimisation is concerned, is that all, apart from the 'Bit Array' type require only a few bytes of data to represent a columnar data structure of a particular size, whereas the 'Bit Array' type requires five pages.

A single blocked Ridset is stored as one single representation covering the entire Ridset (namely in a single blocked Ridset the single representation covers the entire range of the database), whereas a multi-blocked Ridset is stored as a Ridset comprising multiple representations (namely with each representation covering a sub-range of the entire range). Bit Array representations are the only representation type that cannot be used in a single-blocked Ridset. Any Ridset that is complicated enough to require a 'Bit Array' type for storage must be a multi-blocked Ridset.

In a particular embodiment, Ridsets use CSGFile classes (shown and described later) for persistence, and the structure of the Ridset is written out into a CSGFile header structure. The header includes elements such as whether or not the Ridset is multi-blocked, the number of representations, the type of representations and the data, unless it is a Bit Array representation. The actual memory block for 'Bit Array' data is added to the CSGFile as Page data, which gets written after the header information and is page-aligned in the file, as the memory in the Ridset is also page-aligned.

Figure 3:
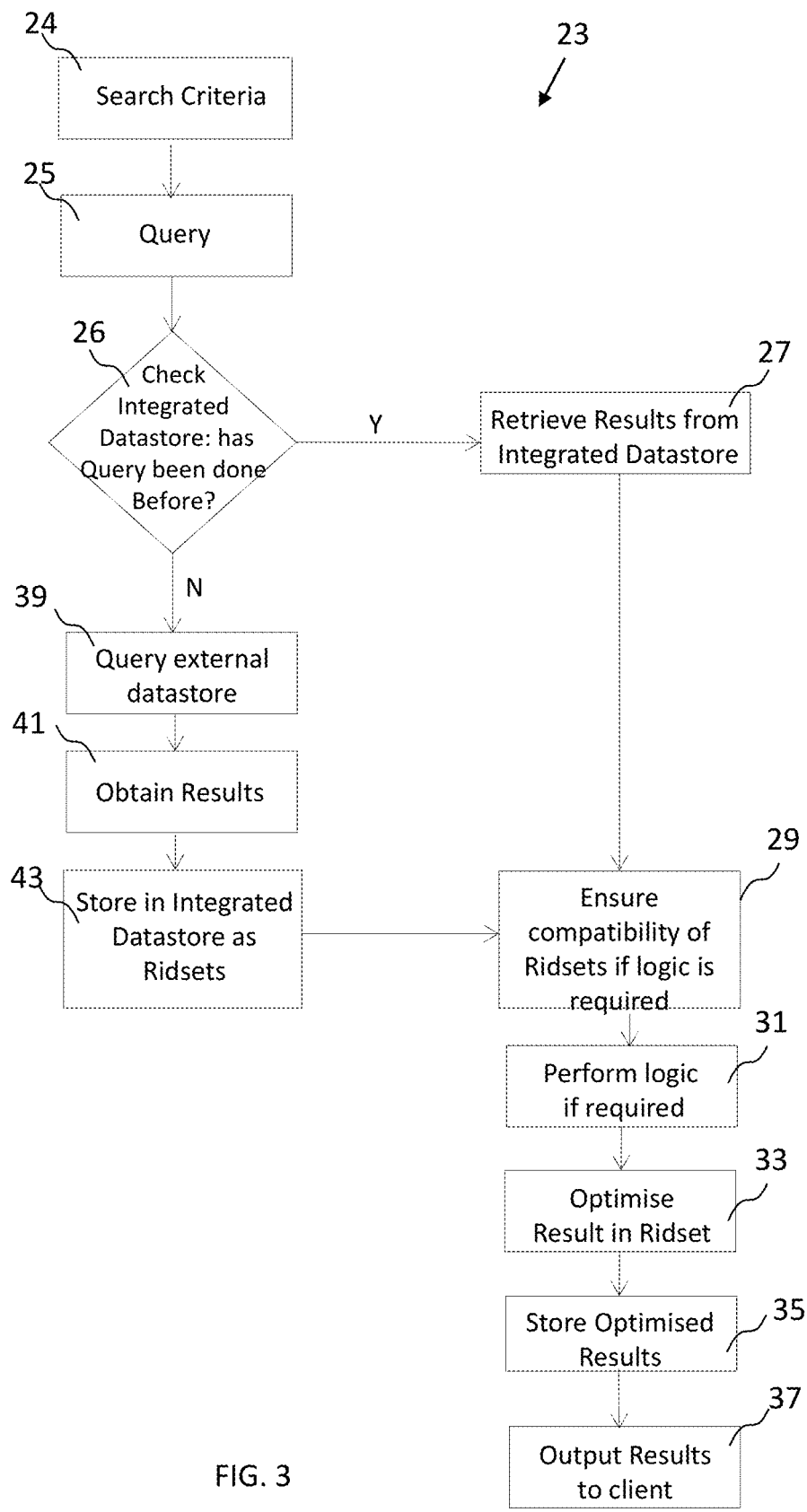
FIG. 3 is a flow chart illustrating how a search query is created and search results are obtained and compressed in accordance with an embodiment of the current invention.

The overview of a search process 23 according to the present embodiment is illustrated in FIG. 3. The process 23 begins with the client's search criteria being inputted at Step 24. For example, a typical selection might be "find all subjects aged below 20, married and earning over 40 k". The search criteria are subsequently transformed at Step 25 into query form, so in accordance with the above example the criteria would be "age <20", "marital status: married", "income >40 k". The database manager 10 then checks, at Step 26, the integrated datastore 16 to see if any of the query results are already stored there.

If so, the results are retrieved, at Step 27, from the integrated datastore 16. Subsequently the Ridsets are prepared for a logical operation which results in their combination at Step 29. This process ensures that the Ridsets are compatible, which will be explained with more detail with reference to FIGS. 5 and 5a. The required logical operations, according to the combination of search criteria set by the client's request, are then performed on the retrieved results at Step 31. In this example, Step 31 would comprise performing a logical 'AND' operation between the retrieved data sets.

For instance, the exemplary result sets in this case could be users that fulfil "age <20" {A, B, F, K, M}, "status: married" {B, D, F, M} and "income >40 k" {A, C, M}. The combination of the result sets would therefore be executed and {A, B, F, K, M } 'AND' {B, D, F, M} 'AND' {A, C, M}={B, M}.

The result set of the logical combination is then optimised, at Step 33, using a method which will be described with more detail below with reference to FIGS. 6 and 7. This method ensures that the new set of results can be stored in the most optimised format. This in turn is a two-step process of carrying out firstly a representation and then a Ridset optimisation on the results of the combination of Step 31.

Following the execution of the optimisation at Step 33, the optimised Ridset 20 is subsequently stored at Step 35 in the integrated datastore 16 and outputted at Step 37 to the client.

Going back to Step 26, if any of the required results is not found in the integrated datastore 16, the external datastore 12 is queried, at Step 39.

The result set(s) are obtained, at Step 41, from the external datastore 12.

The results set(s) are then stored at Step 43 in the integrated datastore 16 in the form of Ridsets. Following this, the method 23 continues with performing the preparation and combination Steps 29 and 31, optimising the results at Step 33, storing the results at Step 35 and outputting the results at Step 37 to the client as has already been described above.

Figure 4:
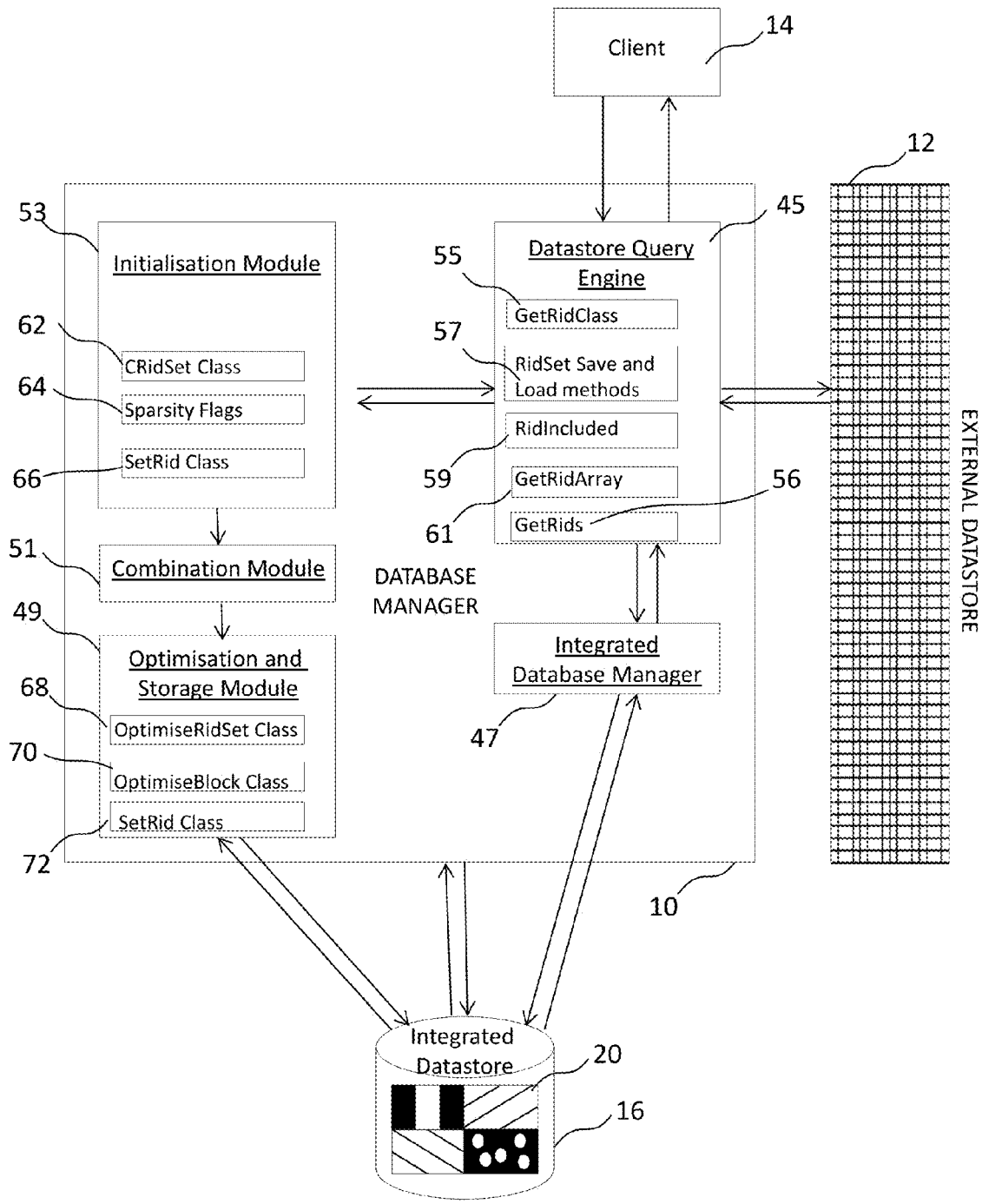

The modules comprising the database manager 10 of FIG. 1 are shown in more detail in FIG. 4. These comprise a Database Query Engine 45, an Integrated Database Manager 47, an Initialisation Module 53, a Combination Module 51 and an Optimisation and Storage Module 49. The client 14 communicates with the datastore query engine 45 which converts the client's search criteria into queries (see Step 25 in FIG. 3) and communicates with the external datastore 12 (see Steps 39 and 41 of FIG. 3). It is also connected with the integrated datastore manager 47. In use, the integrated datastore manager 47 scans the integrated datastore 16, according to Step 26 of the process 23 in FIG. 3, to check if the new query has been run before and the results are available in the integrated datastore 16.

Furthermore, the datastore query engine 45 is also connected with the initialisation module 53 which initialises the Ridsets 20, and the combination module 51 which carries out the logical operations according to Step 31 of the process 23 shown in FIG. 3.

In the present embodiment, the datastore query engine 24 is provided with and uses functions such as 'GetRidClass' 55, 'RidIncluded' 59 and 'RidSet Save/Load' 57. The 'RidIncluded' function 59 can be used to read individual record values on a record-by-record basis, whilst a 'GetRidArray' function 61 can be used to get an array of record IDs that are set in the Ridset, and a 'GetRids' function 56 returns a memory block of record IDs.

The 'RidSet Save/Load' functions 57 take advantage of the CSGFile structure of the Ridsets 20 used in this embodiment, as the CSGFile classes can write the entire file out to disk using Microsoft Windows NT® scatter-gather functions (CSG stands for Class Scatter/Gather), which are the fastest way of getting data onto or off a disk. In addition to this, CSGFile class performs asynchronous file operations. This means that the file operation may still be in progress even though the function call to save or load has finished. The 'Ridset Save/Load' functions 57 take advantage of this, such that the calling thread can continue with other work while the actual data of the Ridset is being copied between memory and disk. Care must be taken when reading a Ridset from disk to memory. Because the file operation may not have finished, it is possible to try to read the memory referenced by the Ridset before it has been populated. To avoid this, a function CRidSet::WaitForObject (not shown) is provided which is called to provide a short delay before trying to access a Ridset 20 after it has been loaded.

The initialisation module 53 initialises the Ridsets 20 where the result sets will be stored. This is done using a CRidSet Class 62, which informs the system 8 whether a single or multiple representations are required, depending on how many records need to be stored. For example, if the RidSet 20 is going to be a simple one, 'empty' or 'full' or with a single value, range or just a few records, then the CRidSet Class 62 uses an appropriate sparsity flag 64, like SparsityFlagSingleValue or SparsityFlagVerySparse, which will initialise a single-block Ridset 20, and save memory. Similarly, if the result is more complicated, in the form of a Bit Array for example, a multiple block Ridset 20 will be initialised to hold the results. In order to set the values of records within the RidSet, a SetRid Class 66 is called.

The combination module 51 is responsible for implementing Steps 29 and 31 of the process 23 shown in FIG. 3. The Ridsets 20 are combined using logic according to the client's requirements. For instance, in the case of the aforementioned example where the client 14 has requested "find all subjects aged below 20, married and earning over 40 k" the results RidSets for "age <20" "marital status: married", "income >40 k" would be combined in this step by performing a logical 'AND' operation between the result sets of "marital status: married" and "income >40 k" and their result would be combined with the result set "age <20", and the resultant type of Ridset determined (single or multi-block), as explained in more detail below, with reference to FIGS. 5, 5*a*.

The combination module 51 is connected with the optimisation and storage module 49. The best representation of the combination of the result RidSets is found and implemented in the optimisation and storage module 49. The optimisation and storage module 49 uses an OptimiseRidSet class 68, an OptimiseBlock class 70 and a SetRid class 72 to carry out representation optimisation 103 and Ridset optimisation 133, as is explained in more detail with reference to FIGS. 6 and 7 below. The optimisation and storage module 49 is connected to the integrated datastore 16 where the resulting Ridset 20 will be stored.

Figure 5:
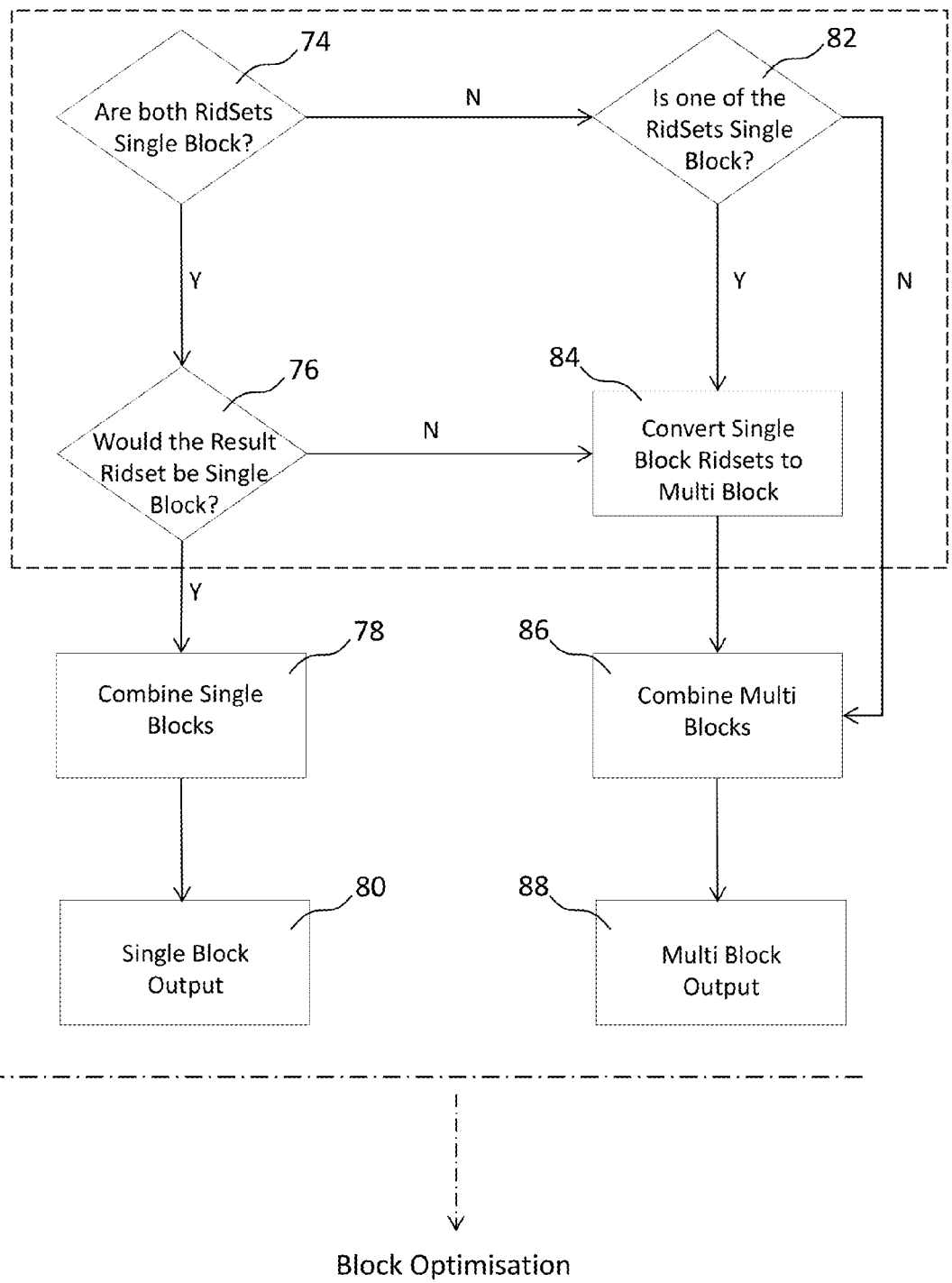
FIG. 5 is a flow chart showing the process of combining result sets which takes place when performing the Steps of preparing and combining Ridsets in FIG. 3.

Turning to FIG. 5, an operational flow diagram of the preparing and combining Steps 29 and 31 of FIG. 3 is shown for combining RidSets in accordance with one embodiment of the present invention. The process 28 commences with checking at Step 74 whether both Ridsets to be combined are single block Ridsets. In the case where that is true, it is checked, at Step 76, whether the result Ridset will also be single-blocked. If it is deduced that their product will be single-blocked as well, then the two representations are combined at Step 74 and their product passed for optimisation, as will be described with more detail with reference to FIGS. 6, 7. The product of the combining Step 78 is a single-blocked, Ridset which is outputted at Step 80. If it is deduced, at Step 78, that both Ridsets are not single-blocked (as it is often the case), then it is examined at Step 82 whether at least one of them is single-blocked. If so, the single-blocked Ridset is converted at Step 84 to a multi-blocked Ridset and the two multi-blocked Ridsets are combined at Step 86 on a block by block basis, i.e. one representation is logically combined with its corresponding representation at a time. Here is to be noted that for a logical operation to be performed on two Ridsets, for each operand in one Ridset there must be a corresponding operand in the other Ridset. This is best achieved by the Ridsets having the same number of blocks or same range for the operation. If none of the Ridsets are found at Step 82 to be single blocks, then they are both combined at Step 86, as illustrated in FIG. 5. The product of the combination Step 86 is a multiple block Ridset which is output at Step 88.

Figure 5A:
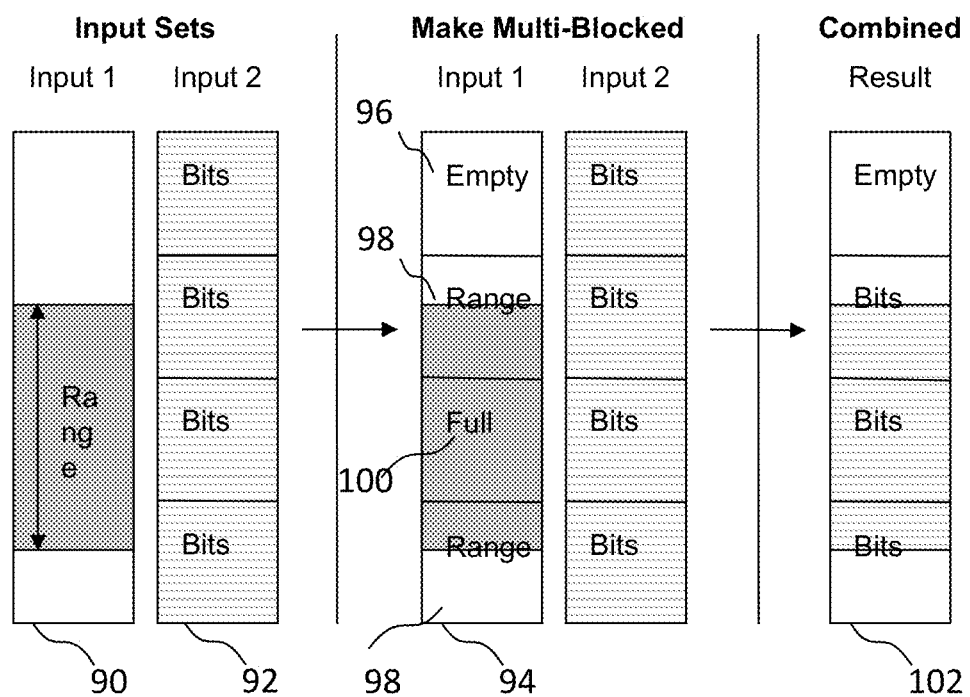
FIG. 5a is a schematic diagram showing an example illustrating the combination process of FIG. 5.

An example of combining a single-blocked and a multi-blocked Ridset according to an embodiment of the present invention is illustrated in the exemplary schematic diagram of FIG. 5*a*. In the example, a single Range representation Ridset 90 is combined using a logical 'AND' operation with a multi-blocked Ridset 92. For this purpose, the Range representation Ridset 90 is converted to a multi-blocked Ridset 94, made up of an Empty representation 96, a Range representation 98, a Full representation 100 and another Range representation 98. The two Ridsets, 94 and 92, now have the same number of blocks covering the same range of the database and can be combined on a block by block basis, to form the result Ridset 102. Accordingly, the smallest range covered by a Ridset representation is a block (namely 4 pages). However the largest range covered by a Ridset representation can be the entire very large database.

According to an embodiment of the present invention, once the Ridsets have been combined according to the method illustrated in FIGS. 5 and 5*a*, their optimal compression is achieved with a method illustrated in FIGS. 6, 7, by optimising their representation type representation, and subsequently their entire Ridset representation.

Figure 6:
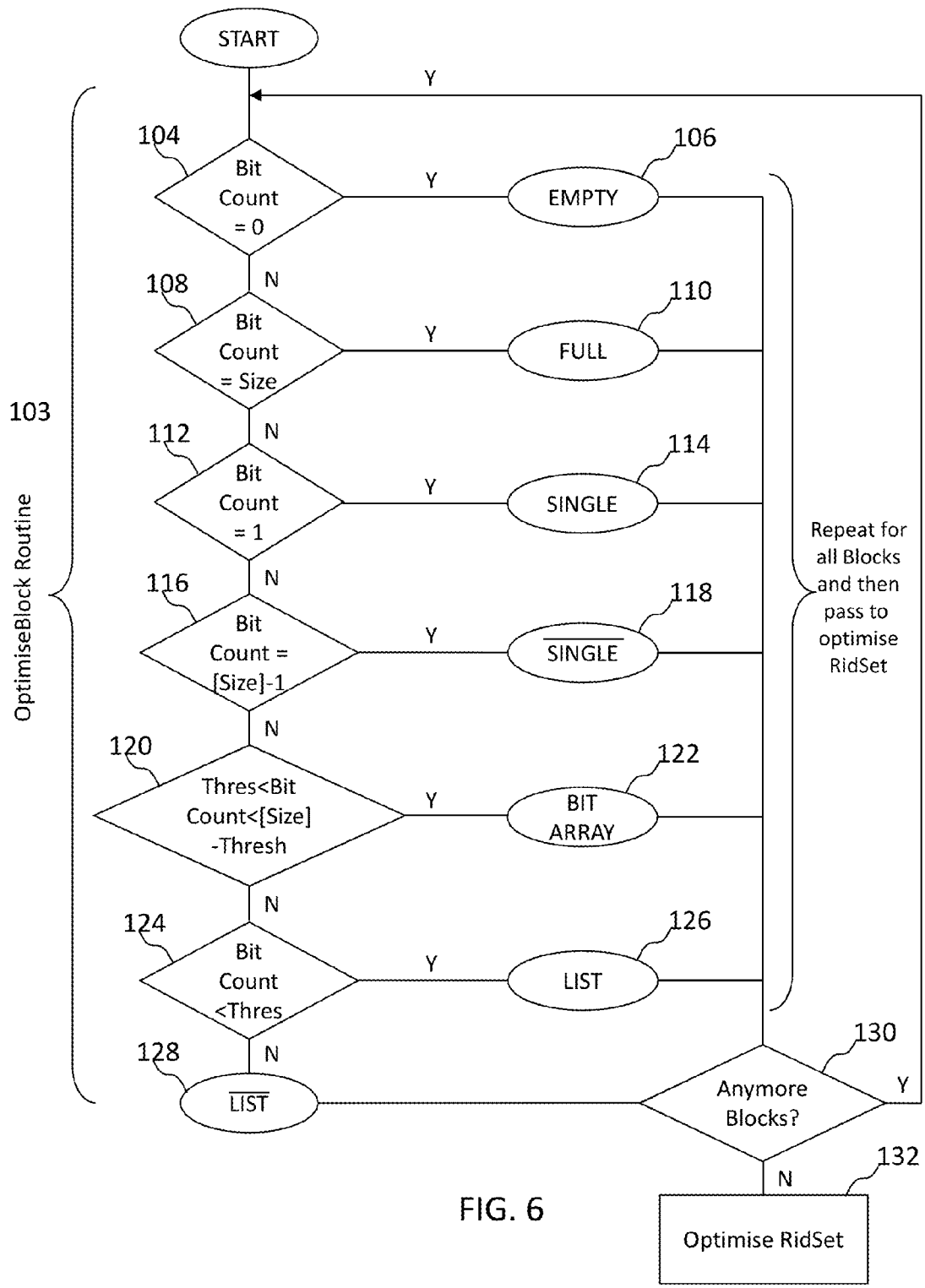
FIG. 6 is a flow chart illustrating how the representations making up the Ridsets are optimised in the Ridset optimisation step of FIG. 3.

Referring in greater detail to FIG. 6, a representation optimisation routine 103 according to the present embodiment is provided to ensure that each representation of the result is as compact as possible. Essentially this is carried out by examining each representation separately using the OptimiseBlock class 70. The block optimisation routine 103 commences with examining, at Steps 104 and 108, whether the block should be represented as an 'Empty' 106 or 'Inverted Empty' ('Full') 110 type.

It is noted that throughout the description below, the number of set bits in a block or in the sub-range of data memory or storage being represented will be referred to as 'bit count'.

More specifically, the bit count is checked at Step 104 for being 0, in which case, the representation is readily converted at Step 106 to an 'Empty' type. If not, it is checked, at Step 108, whether its bit count is equal to its size, in which case the representation is converted at Step 110 to an 'Inverted Empty' type.

If both the checks on bit count have resulted in negative responses, the method 103 continues with examining at Step 112 whether the bit count is equal to 1, in which case it can be converted at Step 114 to a 'Single' type. If the count is not equal to 1, the method then checks, at Step 116, whether the bit count is equal to its size minus 1. If this is true, the representation type is converted at Step 118 to an 'Inverted Single' type.

If neither of Steps 112 or 116 generate positive results, the method then determines at Step 120 whether the bit count, as a percentage of the overall number of bits, is between RIDSET_BITMAP-THRESHOLD, a constant specified by the method, and [1−RIDSET_BITMAP-THRESHOLD]. If this is the case, the representation is converted at Step 122 to a multi-blocked Bit Array.

If the bit count is between these predetermined values, the method checks at Step 124 whether the bit count is below the RIDSET_BITMAP-THRESHOLD. If it is, the representation is converted at Step 126 to a 'List' type. If not, the representation is converted at Step 128 to an 'Inverted List' type.

After each representation has been optimised, it is examined at Step 130 whether the Ridset contains any more representations. If so, the next representation is obtained and the method 103 recommences at Step 104. If not, the converted classified representation, which is the entire Ridset, is passed on to the OptimiseRidset Routine at Step 132, described in more detail with respect to FIG. 7.

Figure 7:
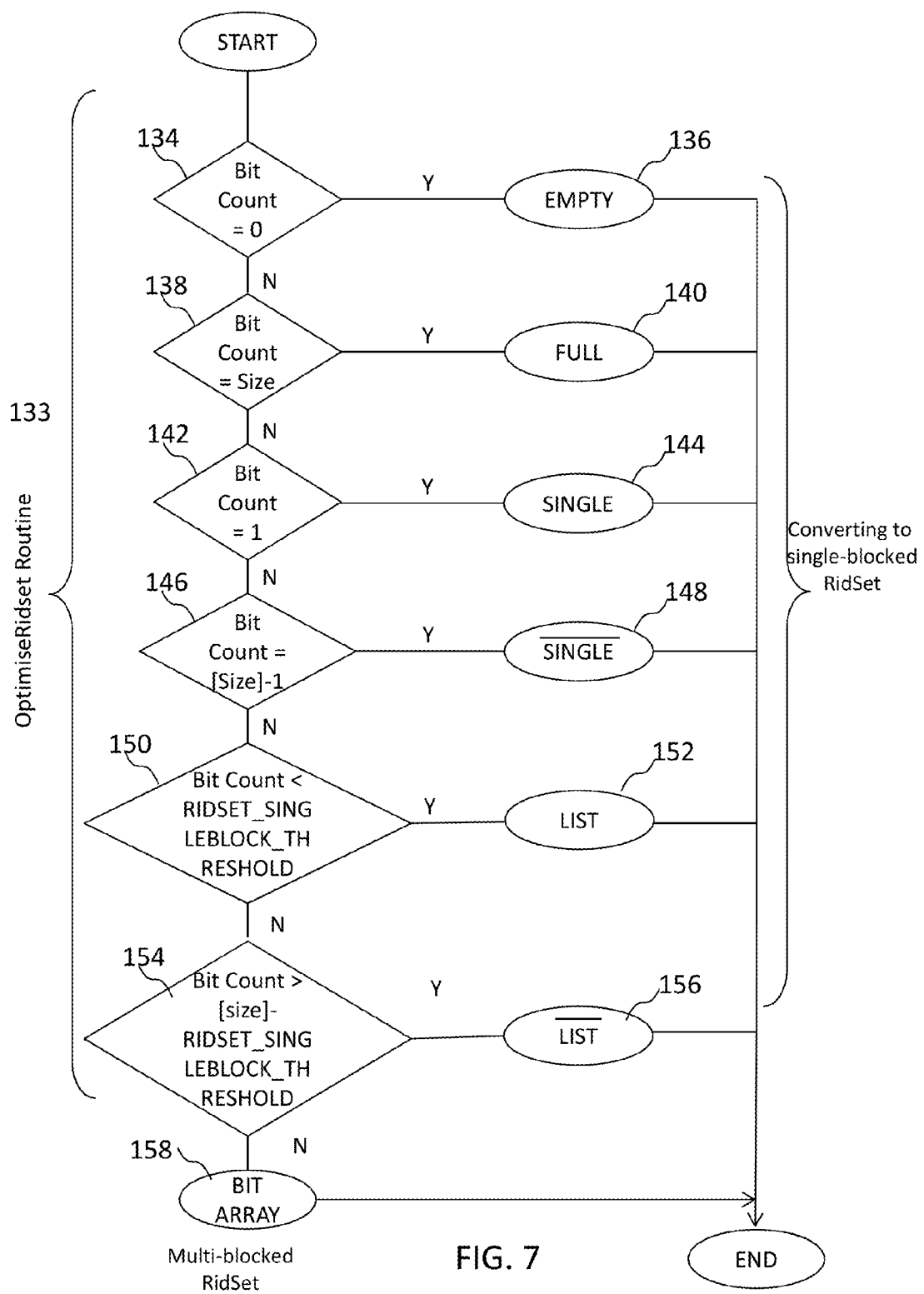
FIG. 7 is a flow chart illustrating how the Ridsets are optimised in Ridset optimisation step of FIG. 3.

Once the best type of representation for each representation has been obtained according to method 103 of FIG. 6, a method of Ridset optimisation 133 is carried out where the whole RidSet 20 is examined to check whether it has the optimal representation using the OptimiseRidSet class 68, as illustrated in the exemplary flow chart in FIG. 7.

More specifically, the entire Ridset's bit count is checked at Step 134 for being 0, in which case, the representation is readily converted at Step 136 to an 'Empty' type, single block representation. If not, it is checked, at Step 138, whether its bit count is equal to its size, in which case the representation is converted at Step 140 to an 'Inverted Empty' type, single block representation.

If both the checks on bit count have resulted in negative responses, the method 133 continues with examining at Step 142 whether the bit count is equal to 1, in which case it can be converted at Step 144 to a 'Single' type, single block representation. If the count is not equal to 1, the method then checks, at Step 146, whether the bit count is equal to its size minus 1. If this is true, it is converted at Step 148 to an 'Inverted Single', single-block representation.

If neither of Steps 142 or 146 generate positive results, the method then determines, at Step 150 whether the bit count is below RIDSET_SINGLEBLOCK_THRESHOLD. If this is the case, the representation is converted in Step 152 to a List type, single-block representation.

RIDSET_SINGLEBLOCK_THRESHOLD is a constant specified by the system. It has a basic value of 0.1%, but is weighted to avoid flip-flopping between representations. If a Ridset is multi-blocked, then it will need to drop below 0.05% to switch to single-block. If a Risdet is single-blocked, then it will need to climb above 0.2% to switch to multi-blocked.

If the bit count is found to be above the corresponding threshold in Step 150, it is checked, in Step 154, whether it is larger than ([size]−RIDSET_SINGLEBLOCK_THRESHOLD), where size refers to the number of records in the Ridset, in which case, it is converted, in Step 156 to an inverted List representation. If not, it is converted in Step 156, to a multi-blocked, Bit Array type representation.

Having described an exemplary embodiment of the present invention, it is to be appreciated that the present embodiment would not be considered limiting to the person of average skill in the art and would be susceptible to modification and variations without departure from the spirit and scope of the invention as set forth in the claims. For example, other types of Ridsets could be used with or in place of the five different types outlined above. One such Ridset type could be a 'Run Length Encoding' (RLE) Ridset.

Figure 8:
FIG. 8 is a schematic block diagram of a data results set represented by an exemplary 'RLE' type Ridset, which can be used as one of the Ridsets shown in FIG. 2.

The 'RLE' type Ridset is similar to the 'range' type, but it is used when there are more than one continuous selections. It consists of one single block which represents the selection using pairs of numbers, each pair comprising a record ID representing the point at which the selection starts and a number representing how many records are selected after that point. Turning to FIG. 8, the selections shown would be represented using the following pairs of numbers: ('2,3', '12,6', '25,2'). In this example '2,3' represents a selection starting at 2 and comprising 3 records, '12,6' represents a selection starting at 12 and comprising 6 records, and '26,2' represent a selection starting at 25 and comprising 2 records.

The embodiments described have used the logical operator 'AND' in exemplifying how Ridsets are combined. However it is to be appreciated that any logical operator can be used such as 'OR', 'NOR', 'NAND', 'EX-OR' etc. depending on the particular attributes of the desired results set which is required.

Whilst the present embodiments have used RidSets as the compressed columnar representation, the present invention is not limited to such use and other types of representation which perform the same function can also be used.

The invention claimed is:

1. A computer-implemented method of searching for sets of data in a very large columnar database, the method comprising:

Carrying out a first query by querying the very large columnar database for a first desired set of data, the database having a range of possible data storage locations;

Creating a compressed columnar representation of the locations within the very large columnar database of members of the first desired set of data; wherein the compressed columnar representation comprises a plurality of representations covering the entire range of the very large database, wherein each representation provides a descriptor describing a distribution of the desired data results within a sub-range of the entire range;

Storing the compressed columnar representation in a data cache; and

Applying a logical operation on first desired set of data stored within the very large columnar database by using the compressed columnar representation stored in the data cache in preference to data stored within the very large columnar database.

2. A computer-implemented method of claim 1, further comprising obtaining the results of the applying step as a columnar representation and optimising the results.

3. A computer-implemented method of claim 2, wherein the optimising step comprises optimising each of the representations of the resultant columnar representation to determine the descriptor to be applied to each representation in view of its current distribution of data results.

4. A computer-implemented method of claim 3, wherein the optimising step comprises establishing whether the number of results provided in the compressed columnar representation is a single block representation or a multi-block representation and determining whether the representation needs to be converted into a multi-block or single block representation respectively.

5. A computer-implemented method of claim 4, wherein the determining step comprises determining whether the number of positive results for a single block compressed columnar representation is above a predetermined threshold and if so converting the single block compressed columnar representation into a multi-block representation.

6. A computer-implemented method of claim 4, wherein the determining step comprises determining whether the number of positive results for a multi-block compressed columnar representation is below a predetermined threshold and if so converting the multi-block compressed columnar representation into a single block representation.

7. A computer-implemented method of claim 1, further comprising storing the results of the logical operation in the data cache as a compressed columnar representation.

8. A computer-implemented method of claim 1, further comprising obtaining a second desired set of data, the second set being provided in a compressed columnar representation.

9. A computer-implemented method of claim 8, further comprising adapting one of the first and second sets of results into a form which is compatible with the other of the first and second set of results respectively for a logical operation to be performed with each set of results being an operand of the logical operation.

10. A computer-implemented method of claim 9, wherein the adapting step comprises changing the size, number and type of representations within one of the compressed columnar representations to match the size and number of representations within the other columnar representation.

11. A computer-implemented method of claim 10, wherein the compressed columnar representation comprises an inversion flag for inverting the results stored therein.

12. A computer-implemented method of claim 10, wherein the compressed columnar representation comprises an 'Empty' type having no positive results within the sub-range the representation covers.

13. A computer-implemented method of claim 10, wherein the compressed columnar representation comprises a 'Full' type having only positive results within the sub-range the representation covers.

14. A computer-implemented method of claim 10, wherein the compressed columnar representation comprises a 'Single' type having one positive result within the sub-range the representation covers.

15. A computer-implemented method of claim 10, wherein the compressed columnar representation comprises an 'Inverted Single' type having all but one positive result within the sub-range the representation covers.

16. A computer-implemented method of claim 10, wherein the compressed columnar representation comprises a 'Range' type having a sequence of positive results between two specified points within the sub-range the representation covers.

17. A computer-implemented method of claim 10, wherein the compressed columnar representation comprises an 'Inverted Range' type having a sequence of negative results between two specified points within the sub-range the representation covers.

18. A computer-implemented method of claim 10, wherein the compressed columnar representation comprises a 'List' type having a list of positive results provided within the sub-range the representation covers, wherein the number of positive results is below a predetermined threshold.

19. A computer-implemented method of claim 10, wherein the compressed columnar representation comprises an 'Inverted List' type having a list of negative results provided within the sub-range the representation covers, wherein the number of negative results is below a predetermined threshold.

20. A computer-implemented method of claim 10, wherein the compressed columnar representation comprises a 'Bit Array' type having positive result within the sub-range the representation covers, wherein the number of positive results is between a predetermined threshold and size of the sub-range the representation covers minus the threshold.

21. A computer-implemented method of claim 1, wherein a step of reading and the step of storing the compressed columnar representations comprises using CSGFile classes.

22. A computer-implemented method of claim 1, further comprising waiting a predetermined amount of time after a compressed columnar representation has been stored to the data cache before reading out the compressed columnar representation is permitted.

23. A computer-implemented method of claim 1, wherein each of the compressed columnar representations comprises a RidSet.

24. A database manager computer program product arranged to search for sets of data in a very large columnar database, the database manager computer program product residing on a non-transitory computer readable medium having a plurality of instructions stored thereon which, when executed by a computer, cause that computer to:
carry out a first query by querying the very large columnar database for a first desired set of data, the database having a range of possible data storage locations;
create a compressed columnar representation of the locations within the very large columnar database of members of the first desired set of data; wherein the compressed columnar representation comprises a plurality of representations covering the entire range of the very large database, wherein each representation provides a descriptor describing a distribution of the desired data results within the sub-range of the entire range;
store the compressed columnar representation in a data cache; and
apply a logical operation on first desired set of data stored within the very large columnar database by using the compressed columnar representation stored in the data cache in preference to data stored within the very large columnar database.

25. A database management system comprising a database manager computer program product of claim 24, an integrated datastore, a client module and an external datastore.

26. A computer-implemented method of searching for sets of data in a very large columnar database, the method comprising:
Carrying out a first query by querying the very large columnar database for a first desired set of data;
Creating a Ridset of the locations within the very large columnar database of members of the desired set of data;
Storing the Ridset in a data cache;
Carrying out a second query for a second set of desired data stored within the very large columnar database, the second query including using the Ridset stored in the data cache in preference to querying the very large columnar database when the further search includes the first desired set of data as at least a subset of the second desired data.

27. A computer-implemented method of searching for a desired data set in a very large columnar database, the method comprising
Carrying out a first query by querying the very large columnar database for a first set of data;
Creating a first Ridset of the locations within the very large columnar database of members of the first set of data;
Carrying out a second query by querying the very large columnar database for a second set of data;
Creating a second Ridset of the locations within the very large columnar database of members of the second set of data;
Storing the first and second Ridsets in an integrated data cache;
Carrying out a logical operation on the first and second Ridsets to determine the desired data set stored within the very large columnar database.

* * * * *